United States Patent
Jenkins et al.

(10) Patent No.: US 11,310,259 B2
(45) Date of Patent: Apr. 19, 2022

(54) CYBERSECURITY ARCHITECTURAL NETWORK BASED ON ARTIFICIAL INTELLIGENCE

(71) Applicant: BANK OF AMERICA CORPORATION, Charlotte, NC (US)

(72) Inventors: Joshua Nathanael Jenkins, Monroe, NC (US); Michael Sbandi, Charlotte, NC (US); Michael Robert Young, Davidson, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 432 days.

(21) Appl. No.: 16/663,523

(22) Filed: Oct. 25, 2019

(65) Prior Publication Data
US 2021/0126934 A1   Apr. 29, 2021

(51) Int. Cl.
*H04L 9/40* (2022.01)
*H04L 29/06* (2006.01)
*G06N 20/00* (2019.01)

(52) U.S. Cl.
CPC ......... *H04L 63/1433* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 8,881,288 B1 * | 11/2014 | Levy | G06F 21/577 709/225 |
| 9,159,246 B2 | 10/2015 | Rodriguez et al. | |
| 10,158,653 B1 * | 12/2018 | Magcale | H04L 63/1408 |
| 2010/0153156 A1 | 6/2010 | Guinta et al. | |
| 2017/0134418 A1 * | 5/2017 | Minoli | H04L 63/1433 |

OTHER PUBLICATIONS

Chaillou, Stanislas., AI & Architecture—An Experimental Perspective. retrieved Oct. 28, 2020 https://towardsdatascience.com/ai-architecture-f9d78c6958e0.

* cited by examiner

*Primary Examiner* — Cai Y Chen
(74) *Attorney, Agent, or Firm* — Moore & Van Allen PLLC; James C. Edwards

(57) ABSTRACT

A system for using artificial intelligence to generate a computing network architecture diagram based on user inputs, applicable vulnerability/cyber threat data and internal/external compliance/audit regulation data. In addition, machine-learning techniques may be used that leverage previously implemented computing network architectures. The computing network architecture diagram may be generated absent a baseline diagram or the user inputs may define at least a portion of an initial/baseline network architecture diagram that is modified based on the vulnerability/cyber threat data, the internal/external compliance/audit regulation data and/or the previously implemented computing network architectures. In additional embodiments of the invention, new/emerging vulnerabilities and cyber threats are detected, and in real-time response, adjustments to the computing network infrastructure and determined and implemented.

20 Claims, 4 Drawing Sheets

CYBERSECURITY ARCHITECTURAL NETWORK BASED ON ARTIFICIAL INTELLIGENCE

FIELD OF THE INVENTION

The present invention is generally related to computing network security and, more specifically, generating computing network architecture diagrams based on artificial intelligence using information provided by an architect and data collected from a network vulnerability database and a network regulation database.

BACKGROUND

Typically, when an entity designs a computing network an architect, otherwise referred to herein as a user, creates a computing network architecture diagram or map that serves as the blueprint for the network. The computing network architecture diagram indicates what network devices and applications are included in the network and how such network devices and application interact.

However, in most instances it is only after the computing network architecture diagram is created that the design is scrutinized in terms security vulnerabilities (e.g., cyber threats and the like), and internal and external audit or compliance regulations. This is a time-consuming effort that typically results in numerous revisions to the computing network architecture diagram to assure that the design protects the infrastructure from security vulnerabilities and meets requisite audit and/or compliance regulations. In certain instance, it is only after network designs are constructed and being tested that security vulnerabilities and/or compliance regulation issues come to light, which may prompt costly network re-design.

Additionally, once computing network designs are implemented, a security threat is posed by new and/or emerging vulnerabilities/cyber threats, which were incapable of being known at the time of design. However, typically a delay exists between when an entity becomes aware of a new/emerging vulnerability and when corrective actions are taken to mitigate the exposure posed by the new/emerging vulnerabilities. Any such delay in implementing the corrective action poses a serious threat to the integrity of the computing network.

Therefore, a need exists to develop systems, methods, computer program products and the like that assure that computing network architecture designs, specifically, diagrams or maps of the computing network architecture are constructed with preventive measures for relevant computing network vulnerabilities (i.e., cyber threats or the like) and knowledge of relevant internal and external audit and compliance regulations. In this regard, the resulting computing network architecture diagram should be less prone to subsequent security and/or regulation compliance-related issues. Moreover, the desired systems, methods, computer program products and the like should be self-learning, so as to leverage previous, successfully implemented, computing network architecture designs in the design currently be created. In addition the desired systems, methods, computer program products and the like should provide for a computing network that is able to detect emerging/new security vulnerabilities and make immediate adjustments within the infrastructure to mitigate and/or eliminate the threats posed by such vulnerabilities.

SUMMARY OF THE INVENTION

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by presenting systems, methods, computer program product and/or the like that provide for automatically generating a computing network architecture diagram using artificial intelligence that relies on architect inputs and data collected from a computing network vulnerability database and a computing network regulation database. As such the network architecture diagram takes into account known network vulnerabilities/cyber models and internal and external compliance regulations. In additional embodiments of the invention, machine learning is used that relies on data collected from a computing network architecture database (i.e., previously designed network architectures) to generate the network architecture diagram.

In specific embodiment of the invention, the architect/user inputs define general information and/or requirements of the computing network, in which case the network architect diagram is generated absent a baseline diagram. While in other embodiments of the invention, the architect/user inputs provide for a least a portion of an initial/baseline network architecture, which is modified to completion based on the vulnerability/cyber model data, the internal/external compliance guidelines and/or the previously designed network architectures.

Moreover, in further embodiments of the invention, once the computing network architecture diagram has been generated and implemented as the network infrastructure, internal and external sources are monitored for detection of new/emerging vulnerabilities/cyber threats and, in real-time response to detecting such, adjustments to the computing network architecture are determined and implemented. Such adjustments may include, but are not limited to, (i) modifying types of network traffic permitted to enter or exit the computing network, and/or (ii) re-routing specified types of network traffic one application and/or computing apparatus to another application and/or computing apparatus.

Thus, embodiments of the invention are capable of automatically generating a robust computing network architecture diagram that mitigates the need for taking actions to address known vulnerabilities/cyber threats or and assuring compliance with internal/external regulations after the diagram has been generated. Moreover, in specific embodiments of the invention the generation of network architecture diagram uses machine-learning techniques for the purpose of leveraging previous, successfully implemented, computing network architecture designs in the current network architecture diagram. In additional embodiments of the invention, adding network security is realized by making real-time adjustments to the computing network in the event that new-emerging security vulnerabilities are detected.

A system for assuring security in designing a computing network architecture defines first embodiments of the invention. The system includes a computing network vulnerability database configured to store first data associated with computing network vulnerabilities and a computing network regulation database configured to store second data associated with internal and external computing network regulations. The system additionally included a computer platform, which is in distributed network communication with the computing network vulnerability and computing network regulation databases. The computer platform includes a memory and at least one computing processor in communication with the memory. The memory stores first instructions that are executable by the at least one processor. The instructions are configured to receive user inputs that define parameters for designing a computing network architecture. In response to receiving the user inputs, the instructions are configured to (1) access the computing network vulnerability database and determine, by artificial intelligence (AI) processing including machine learning (ML), a portion of the first data associated with computing network vulnerabilities that is responsive to the user inputs, and (2) access the computing network regulation database and determine, by AI processing including ML, a portion of the second data associated with internal and external computing network regulations that is responsive to the user inputs. The instructions are further configured to generate, by AI processing including ML, a computing network architecture diagram based on (i) the user inputs, (ii) the portion of the first data associated with the computing network vulnerabilities, and (iii) the portion of the second data associated the internal and external computing network regulations.

In specific embodiments the system further includes a computing network architecture database configured to store third data associated with previously designed computing network architectures. In such embodiments of the invention the first instructions are further configured to access the computing network architecture database and determine, by AI processing including ML, a portion of the third data associated with previously designed computing network architectures responsive to at least one of (i) the user inputs, (ii) the portion of the first data, and (iii) the portion of the second data. Moreover, in such embodiments of the system the instructions are further configured to generate the computing network architecture diagram based on (i) the user inputs, (ii) the portion of the first data associated with the computing network vulnerabilities, (iii) the portion of the second data associated the internal and external computing network regulations, and (iv) the portion of the third data associated with the previously designed network architectures.

In other specific embodiments of the system, the first instructions are further configured to receive the users inputs that create at least a portion of an initial computing network architecture diagram and generate the computing network architecture diagram by modifying the initial computing network architecture diagram based on (i) the user inputs, (ii) the portion of the first data associated with the computing network vulnerabilities, and (iii) the portion of the second data associated the internal and external computing network regulations.

In further specific embodiments of the system, the instructions are further configured to provide at least one of (i) rationale for generating the computing network architecture diagram and (ii) information on one or more cyber threats minimized by the computing network architecture diagram.

In still further specific embodiments of the system, the first data stored in the computing network vulnerability database includes a plurality computing patches for specified computing software configured to address one or more computing security vulnerabilities. In such embodiments of the system, the instructions are further configured to access the computing network vulnerability database and determine one or more of the computing patches responsive to the user inputs and generate the computing network architecture diagram including requiring execution of the one or more of the computing patches on computing application(s) and/or computing hardware in the computing network architecture diagram.

In additional specific embodiments of the system, the second data stored by the computing network regulation database includes at least one of internal audit requirements and external audit requirements. In such embodiments of the system, the instructions are further configured to access the computing network regulation database and determine the internal audit requirements and/or the external audit requirements responsive to the user inputs, and generate the computing network architecture diagram including the internal audit requirements and/or the external audit requirements applicable to computing application(s) and/or computing hardware in the computing network architecture diagram.

Moreover, in additional embodiments of the system, the memory of the computer platform stores second instructions that are configured to monitor for detection of computing network vulnerabilities, and, in real-time response to detecting a computing network vulnerability (i) determine, by AI processing including ML, one or more adjustments to a computing network associated with the computing network architecture based on the detected computing network vulnerability, and (ii) implement the one or more adjustments to the computing network. In such embodiments of the system, the second instructions configured to monitor include instructions configured to monitor external resources for detection of computing network vulnerabilities. In further such embodiments of the system the one or more adjustment include (i) modifying types of network traffic permitted to enter or exit the computing network, and/or (ii) re-routing specified types of network traffic from at least one of a first application and a first computing apparatus to a second application and/or a second computing apparatus.

A computer-implemented method for assuring security in designing a computing network architecture defines second embodiments of the invention. The method is implemented by one or more processing devices and includes receiving user inputs that define parameters for designing a computing network architecture. The method further includes (1) accessing a computing network vulnerability database and determining, by artificial intelligence (AI) processing including machine learning (ML), first data associated with computing network vulnerabilities responsive to the user inputs, and (2) accessing a computing network regulation database and determining, by AI processing including ML, second data associated with internal and external computing network regulations responsive to the user inputs. The method further includes generating, by AI processing including ML, a computing network architecture diagram based on (i) the user inputs, (ii) the first data associated with the computing network vulnerabilities, and (iii) the second data associated the internal and external computing network regulations.

In specific embodiments the method further includes accessing a computing network architecture database and determining, by AI processing including ML, third data associated with previously designed computing network architectures responsive to at least one of (i) the user inputs, (ii) the first data, and (iii) the second data. In such embodiments of the method generating further includes generating, by AI processing including ML, the computing network architecture diagram based on (i) the user inputs, (ii) the first data associated with the computing network vulnerabilities, (iii) the second data associated the internal and external computing network regulations, and (iv) the third data associated with the previously designed network architectures.

In still further specific embodiments of the method receiving the user inputs further includes receiving the user inputs that create at least a portion of an initial computing network architecture diagram. In such embodiments of the method, generating the computing network architecture diagram further includes generating, by AI processing and ML, the computing network architecture diagram by modifying the initial computing network architecture diagram based on (i) the user inputs, (ii) the first data associated with the computing network vulnerabilities, and (iii) the second data associated the internal and external computing network regulations.

A computer program product including a non-transitory computer-readable medium defines third embodiments of the invention. The computer-readable medium includes a first set of codes for causing a computer to receive user inputs that define parameters for designing a computing network architecture. The computer-readable medium additionally includes a second set of codes for causing a computer to access a computing network vulnerability database and determine, by artificial intelligence (AI) processing including machine learning (ML), first data associated with computing network vulnerabilities responsive to the user inputs. In addition, the computer-readable medium includes a third set of codes for causing a computer to access a computing network regulation database and determine, by AI processing including ML, second data associated with internal and external computing network regulations responsive to the user inputs. Further, the computer-readable medium includes a fourth set of codes for causing a computer to generate, by AI processing including ML, a computing network architecture diagram based on (i) the user inputs, (ii) the first data associated with the computing network vulnerabilities, and (iii) the second data associated the internal and external computing network regulations.

In specific embodiments of the computer program product, the computer-readable medium includes a fifth set of codes for causing a computer to access a computing network architecture database and determine, by AI processing including ML, third data associated with previously designed computing network architectures responsive to at least one of (i) the user inputs, (ii) the first data, and (iii) the second data. In such embodiments of the computer program product, the fourth set of codes is further configured to generate, by AI processing including ML, the computing network architecture diagram based on (i) the user inputs, (ii) the first data associated with the computing network vulnerabilities, (iii) the second data associated the internal and external computing network regulations, and (iv) the third data associated with the previously designed network architectures.

In still further specific embodiments of the computer program product, the first set of codes is further configured to cause the computer to receive the user inputs that create at least a portion of an initial computing network architecture diagram, and the fourth set of codes is further configured to cause the computer to generate, by AI processing and ML, the computing network architecture diagram by modifying the initial computing network architecture diagram based on (i) the user inputs, (ii) the first data associated with the computing network vulnerabilities, and (iii) the second data associated the internal and external computing network regulations.

Thus, according to embodiments of the invention, which will be discussed in greater detail below, the present invention provides for relying on artificial intelligence for automatically generating a computing network architecture diagram that takes into account known network vulnerabilities/cyber threats and internal/external compliance/audit regulations. In addition, the invention relies on machine-learning techniques for the purpose of leveraging previous, successfully implemented, computing network architecture designs in the generating the current network architecture diagram. In additional embodiments of the invention real-time adjustments to the network infrastructure may occur in automated response to detection of a new/emerging vulnerability/cyber threat.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
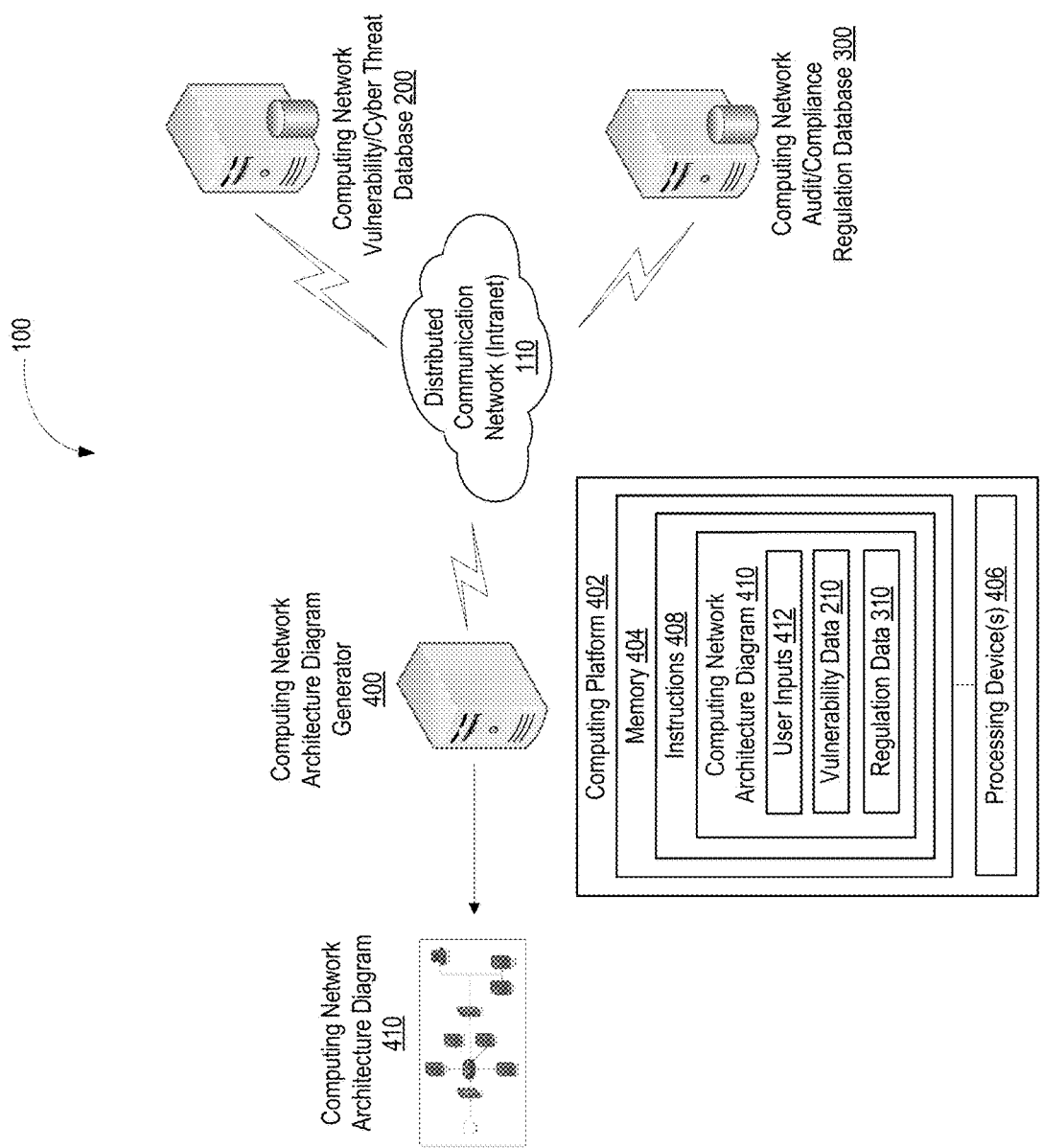
Figure 2:
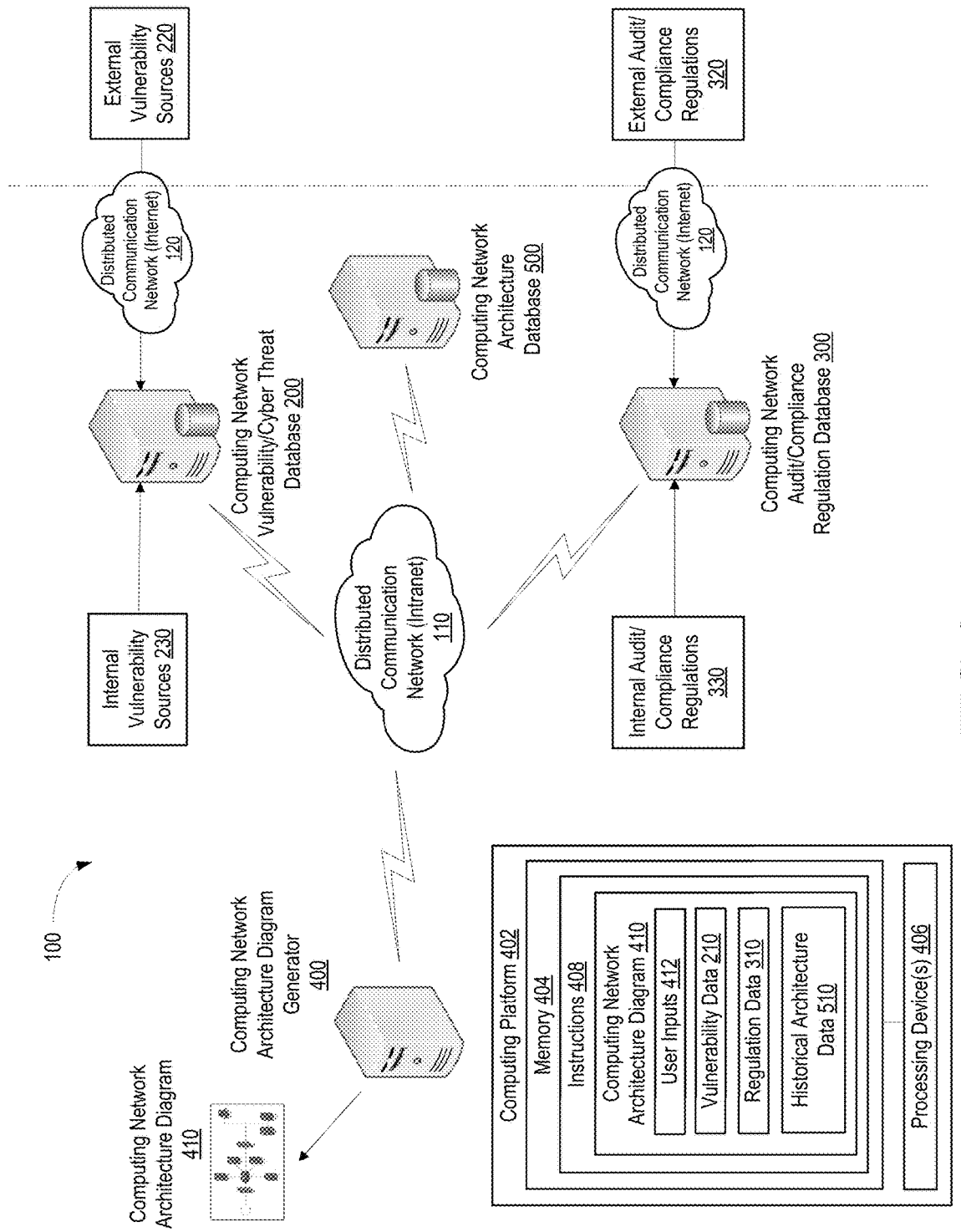
Figure 3:
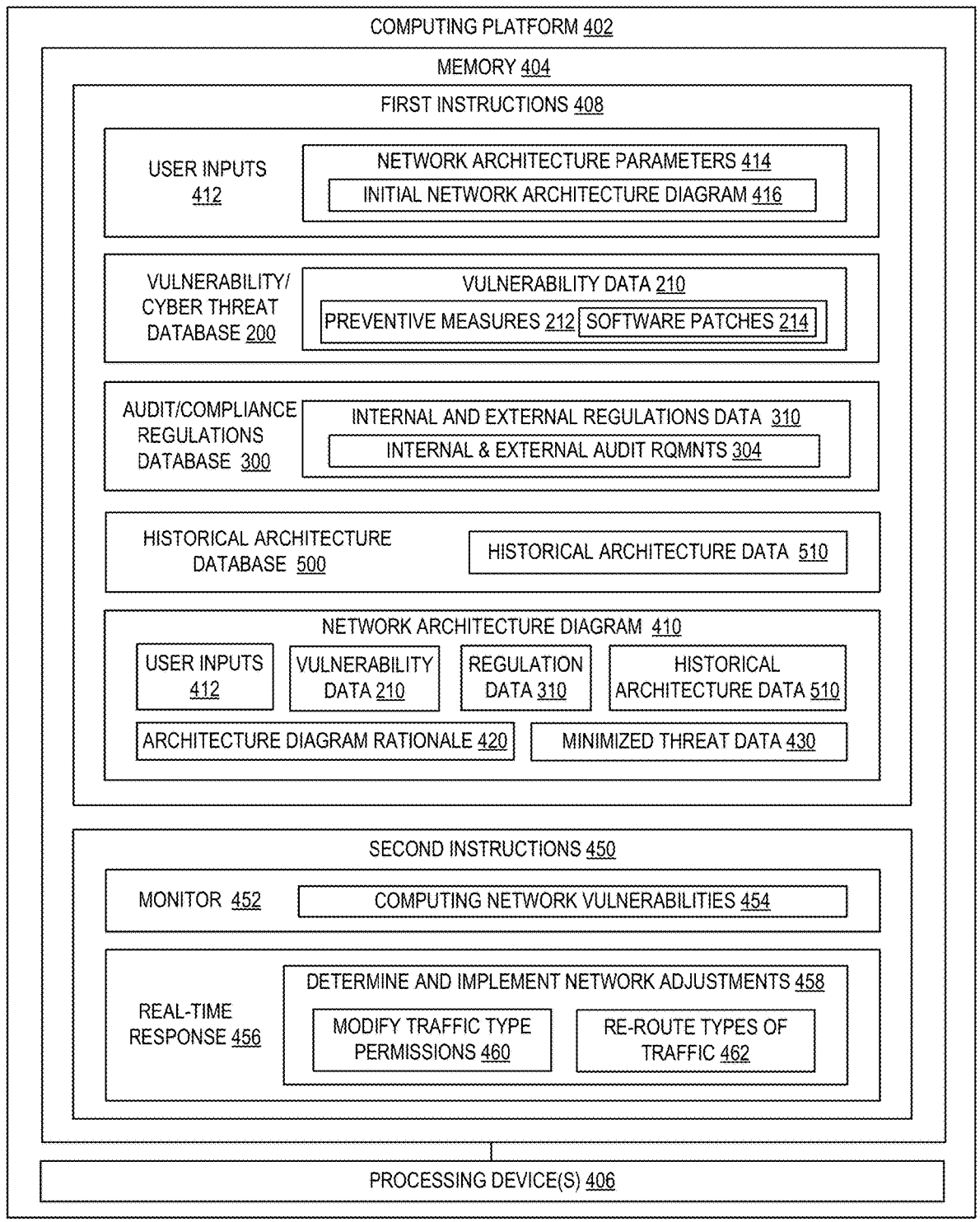
Figure 4:
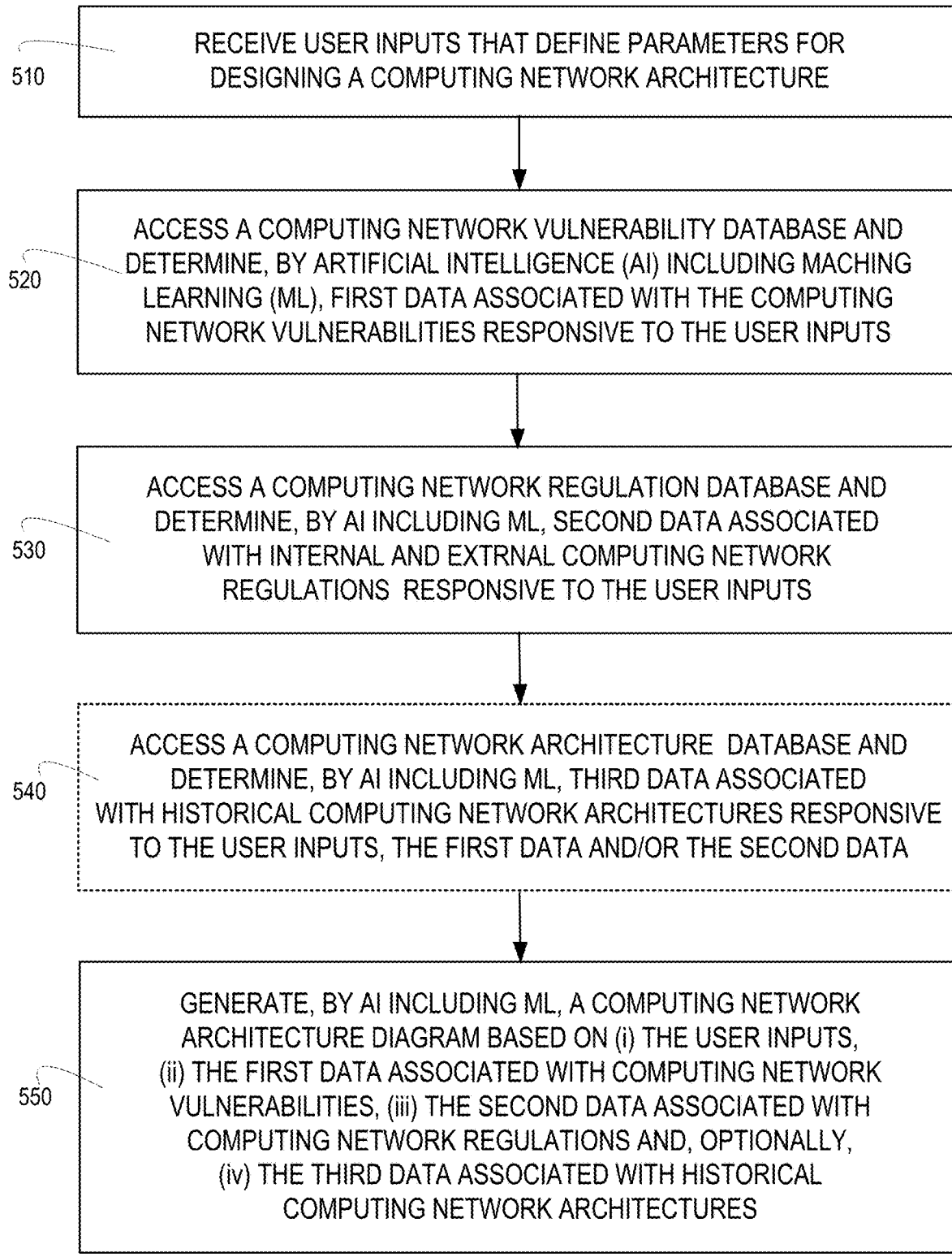

Having thus described embodiments of the disclosure in general terms, reference will now be made to the accompanying drawings, wherein:

FIG. 1 is a schematic diagram of a system for generating a computing network architecture diagram, in accordance with embodiments of the present invention;

FIG. 2 is a more detailed schematic diagram of a system for generating a computing network architecture diagram, in accordance with some embodiments of the present disclosure;

FIG. 3 is a block diagram of a computing platform for generating a computing network architecture diagram, in accordance with embodiment of the present invention; and FIG. 4 is a flow diagram of a method for generating a computing network architecture diagram, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, as described in greater detail below, embodiments of the invention provide for automatically generating a computing network architecture diagram using artificial intelligence that relies on architect inputs and data collected from a computing network vulnerability database and a computing network regulation database. As such the network architecture diagram takes into account known network vulnerabilities/cyber models and internal and external compliance regulations. In additional embodiments of the invention, machine learning is used that relies on data collected from a computing network architecture database (i.e., previously designed network architectures) to generate the network architecture diagram.

In specific embodiment of the invention, the architect/user inputs define general information and/or requirements of the computing network, in which case the network architect diagram is generated absent a baseline diagram. While in other embodiments of the invention, the architect/user inputs provide for a least a portion of an initial/baseline network architecture, which is modified to completion based on the vulnerability/cyber model data, the internal/external compliance guidelines and/or the previously designed network architectures.

Moreover, in further embodiments of the invention, once the computing network architecture diagram has been generated and implemented as the network infrastructure, internal and external sources are monitored for detection of new/emerging vulnerabilities/cyber threats and, in real-time response to detecting such, adjustments to the computing network architecture are determined and implemented. Such adjustments may include, but are not limited to, (i) modifying types of network traffic permitted to enter or exit the computing network, and/or (ii) re-routing specified types of network traffic one application and/or computing apparatus to another application and/or computing apparatus.

Turning now to the figures, FIG. 1 a schematic diagram is provided of a system 100 for generating a computing network architecture diagram, in accordance with embodiments of the present invention. The system 100 includes a computing network vulnerability database 200 that is configured to store data associated with computing network vulnerabilities, e.g., cyber threats and the like. In those embodiment of the invention, in which system 100 is implemented by a large entity, the database includes most, if not all, of the computing network vulnerability data that the entity possesses, including known cyber threats and remedies to correct such cyber threats, such as, but not limited to software patches and the like.

The system 100 additionally includes a computing network regulation database 300 that is configured to store data associated with both internal and external computing network regulations, such as, but not limited to, internal and external compliance and/or audit regulations. In many instances, the entity that implements the system 100, will be subject to both internal regulations and external regulations (e.g., local, state or federal regulations) that are relevant to computing network architecture.

In addition, system 100 includes computing network architecture diagram generator 400 embodied within a computing platform 402, such as a server or another apparatus capable of performing requisite computing functions. The computing platform 402 includes a memory 404 and at least one processing device 406 in communication with the memory 404. The memory 404 stores instructions 408 that are executable by the processing device(s) 406 and configured to receive user inputs 412 that define parameters for designing a computing network architecture. As will be discussed in more detail below, in specific embodiments of the invention, the user inputs 412 may be general information relevant to generating the computing network architecture diagram/map 410, while in other embodiments of the invention, the user inputs 412 may serve to create/generate an initial/baseline computing network architecture diagram/map.

The instructions 408 are further configured to access the computing network vulnerability database 200 and determine, using artificial intelligence (AI) including machine learning (ML) techniques, vulnerability data 210 that is responsive to the user inputs 412. In other words, AI and ML are used to determine vulnerabilities/cyber threats that are applicable to the computing network architecture being designed and, where applicable, the remedies that need to be incorporated into the design to prevent such vulnerabilities/cyber threats. In addition, instructions 408 are further configured to access the computing network regulations database 300 and determine, using AI including ML, regulation data 310 that is responsive to the user inputs 412. In other words, the AI and ML are used to determine internal and external audit and/or compliance regulations that are applicable to the computing network architecture being designed. The computing network vulnerability network 200 and the regulations database 300 are accessed via distributed computing network 110, which may comprise an intranet or the like.

Further, instructions 408 are configured to generate, by AI including ML, a computing network architecture diagram/map 410 based on (i) the user inputs 412, (ii) the vulnerability data 210 and (iii) the regulations data 310. The computing network architecture diagram/map 410 includes the software (e.g., applications, modules and the like), middleware and hardware (e.g., servers, routers, switches, storage, firewalls and the like) including the connections between such. In addition, the computing network architecture diagram/map 410 includes details pertaining to how the software, middleware and/or hardware connect (e.g., type of connections, IP addresses) and how the software, middleware and/or hardware (e.g., data exchanged, upstream/downstream dependencies and the like). In those embodiments of the invention, in which the user inputs 412 are general information/criteria pertaining the computing network architecture, the computing network architecture diagram 410 is generated anew (i.e., absent a baseline computing network architecture diagram). While in other embodiments of the invention, in which the user inputs 412 serve to generate the initial/baseline computing network architecture diagram, the generating the computing network architecture diagram 410 includes modifying the initial/baseline computing network architecture diagram 410 based on relevant vulnerability data 210 and regulation data 310.

Referring to FIG. 2 a more detailed schematic diagram of a system 100 for generating a computing network architecture diagram/map is presented, in accordance with alternative embodiments of the present invention. The system additionally includes a computing network architecture database 500 that is configured to store data associated with historical computing network architectures. In such embodiments of the invention, the instructions 408 are further configured to access the computing network architecture database 500 and determine, using AI and ML, historical computing network architecture data 510 that is responsive to at least one of the user inputs 412, the vulnerability data 210 and/or the regulation data 310. In other words, AI and ML are used to determine historical computing network architectures that are applicable to the computing network architecture being designed and/or the vulnerabilities applicable to the computing network architecture being designed and/or the regulations applicable to the computing network architecture being designed.

In addition, FIG. 2 highlights that, according to specific embodiments of the invention, the computing network vulnerability/cyber threat database 200 may receive data from internal vulnerability sources 230 (e.g., modules, applications or the like configured to detect incoming cyber threats or other vulnerabilities within the existing computing network infrastructure or other preventive measure sources, such as software patch/revision modules or the like) and external vulnerability sources 220. In this regard, the database 200, or applications associated therewith, may monitor external vulnerability sources, accessible via a distributed communication network 120, such as the Internet, to detect new/emerging vulnerabilities and/or new/emerging preventive measures for addressing known or new/emerging vulnerabilities/cyber threats.

Additionally, the computing network regulations database 300 is configured to receive internal audit/compliance regulations 330 and external audit/compliance regulations 320. The external audit/compliance regulations may include, but are not limited to, government (e.g., federal, state or the local) audit/compliance regulations. In this regard, the database 300, or applications associated therewith, may monitor external audit/compliance regulation sources, accessible via a distributed communication network 120, such as the Internet, for changes/revisions to audit/compliance regulations that affect computing network architecture designs to ensure that the audit/compliance regulations stored in the computing network regulations database 300 are current.

It should be noted that the databases 200, 300 and 500 may be accessed each time a computing network architecture diagram is generated to determine vulnerability data 210, regulation data 310 and historical architecture data that is applicable to the computing network architecture design. In other embodiments of the invention, the databases 200, 300, and 500 may be accessed periodically and the contents therein may be stored in memory 404 of computing platform 402 of computing network architecture generator 400 (i.e., the vulnerability data 210, the regulation data 310 and/or historical architecture 510 may, in some embodiments, be stored by the application/module configured for generating the computing network architecture diagrams or, in other embodiments, stored remotely and accessed each time an architecture diagram is generated).

Referring to FIG. 3 a block diagram is presented of the computing platform 402 configured for generating computing network architecture diagrams/maps 410, in accordance with embodiments of the present invention. The computing platform 402 is disposed in the distributed communication network 110 (shown in FIGS. 1 and 2) and may comprise one or more computing devices (e.g., servers, computing devices, or the like). The computing platform 402 is configured to execute algorithms, modules, routines, applications, such as instructions 408. Computing platform 402 includes memory 404, which may comprise volatile (i.e., temporary) and non-volatile (i.e., permanent) memory, such as read-only and/or random-access memory (RAM and ROM), EPROM, EEPROM, flash cards, or any memory common to computing platforms). Moreover, memory 404 may comprise cloud storage, such as provided by a cloud storage service and/or a cloud connection service.

Further, computing platform 402 also includes at least one processing device 406, which may be an application-specific integrated circuit ("ASIC"), or other chipset, logic circuit, or other data processing device. Processing device(s) 406 may execute one or more application programming interface (APIs) (not shown in FIG. 3) that interface with any resident programs, such as first instructions 408 and second instructions 450 or the like, stored in the memory 404 of the computing platform 402 and any external programs. Processing devices(s) 406 may include various processing subsystems (not shown in FIG. 3) embodied in hardware, firmware, software, and combinations thereof, that enable the functionality of the computing platform 402 and the operability of the computing platform 402 on the distributed communication network 110 (shown in FIGS. 1 and 2). For example, processing subsystems allow for initiating and maintaining communications and exchanging data with other networked devices, such as databases 200, 300, 500 and the like. For the disclosed aspects, processing subsystems of processing device 406 may include any subsystem used in conjunction with first instructions 408 and second instructions 450 and related tools, routines, sub-routines, algorithms, sub-algorithms, sub-modules thereof.

Computing platform 402 may additionally include a communications module (not shown in FIG. 3) embodied in hardware, firmware, software, and combinations thereof, that enables electronic communications between the computing platform 402 and other network devices, such as databases, 200, 300, and 500. Thus, communication module may include the requisite hardware, firmware, software and/or combinations thereof for establishing and maintaining a network communication connection with one or more network devices.

Memory 304 of computing platform 300 stores first instructions 408 that are executable by the processing device (s) 406 and configured for generating a computing network architecture diagram/map 410. In specific embodiments of the invention the first instructions 408 are configured to receive user inputs 412 that define parameters 414 for designing a computing network architecture. As previously discussed, in specific embodiments of the invention, the parameters 414 may be general information/requirements for the design of the computing network architecture, or, in other specific embodiments of the invention, the parameters 414 may actual components of the computing network architecture, such that, the user inputs 412 serve to generate an initial/baseline network architecture diagram 416.

The first instructions 408 are further configured to access computing network vulnerability/cyber threat database 200 and determine, using AI including ML techniques, vulnerability data 210 responsive to the user inputs 412. In specific embodiments of the invention, the vulnerability data 210 may include preventive measures 212 for preventing the occurrence of vulnerability/cyber threats that are applicable to the computing network architecture design. The preventive measures 212 may include the need for secure connections, secure communications and/or software patches/revisions 214 required to be installed on network devices and/or network applications.

The first instructions 408 are further configured to access audit/compliance regulations database 300 and determine, using AI and ML techniques, internal and external regulation data 310 that are responsive to the user inputs 412. In specific embodiments of the invention, the regulation data 310 may include internal and/or external (e.g., government-imposed audit requirements or the like) audit requirement data 304, which is pertinent to the computing network being designed.

In specific embodiments of the invention the first instructions 408 are further configured to access the historical computing network architecture database 500 and, determine, using AI and ML techniques, historical architecture data 510 that is responsive to at least one of (i) the user inputs 412, (ii) the vulnerability/cyber threat data 210, (iii) the regulations data 310. In this regard, machine learning (ML) techniques are relied upon to determine which one(s) of the historical computing network architecture are similar to or otherwise can be relied upon in designing the current computing network architecture (i.e., generating the current computing network architecture diagram/map 410).

First instructions 408 are further configured to generate, using AI including ML, the computing network architecture diagram 410 based on (i) the user inputs, (ii) the vulnerability/cyber threat data 210, (iii) the regulations data 310 and, in specific embodiments, (iv) the historical architecture data 510. As previously discussed, the computing network architecture diagram 410 includes the software (e.g., applications, modules and the like), middleware and hardware (e.g., servers, routers, switches, storage, firewalls and the like) including the connections between such. In addition, the computing network architecture diagram/map 410 includes details pertaining to how the software, middleware and/or hardware connect (e.g., type of connections, IP addresses) and how the software, middleware and/or hardware (e.g., data exchanged, upstream/downstream dependencies and the like.

In those embodiments of the invention, in which the user inputs 412 define general information parameters for the computing network architecture, the computing network architecture diagram 410 is generated anew. In other embodiments of the invention, in which the user inputs 412 define actual network architecture components and structure to form a baseline/initial computing network architecture diagram, generating the architecture diagram 410 includes modifying the baseline/initial computing network architecture diagram based on the user inputs 412 and aforementioned data 210, 310 and/or 510 to result in the computing network architecture diagram 410. In specific embodiments of the invention, baseline/initial architecture diagram is modified on-the-fly as the user provides inputs 410 for designing the baseline/initial architecture diagram. In such embodiments the user is able to visually see, in real-time, the effects of the vulnerability data 210, the regulation data 310 and/or the historical architecture data 510 on their current architecture design.

Further, in specific embodiments of the invention, first instructions 408 are further configured to provide, along with the architecture diagram 410, the architecture diagram rationale 420 (i.e., reasons why the network architecture is designed the way it is, specifically emphasizing the vulnerabilities and regulations applicable to the network architecture). Moreover, the first instructions are configured to provide minimized threat data 430 on the vulnerabilities/cyber threats minimized and, in some instances, eliminated based on the computing network architecture.

In other specific embodiments of the invention, the memory 404 of computing platform 402 stores second instructions 450 that are configured to provide real-time network adjustments in response to detecting computing network vulnerabilities/cyber threats. In this regard, second instructions 450 are configured to monitor 452 for detection of computing network vulnerabilities 454. The monitoring may be internal monitoring and/or external monitoring (i.e., monitoring Internet-based sites that report on new/emerging vulnerabilities/cyber threats or the like).

Further, in real-time response 456 to the monitoring resulting in detection of a computing network vulnerability/ cyber threat, the instructions 450 are further configured to determine and implement one or more adjustments 458 to the computing network associated with the computing network architecture. The adjustments may include, but are not limited to, modifying the type of traffic permissions 460 (i.e., instructing a firewall or the like to forbid certain type(s) of network traffic from entering the network and/or being transmitted out of the network) and/or re-routing specific types of network traffic 462 (i.e., instructing a firewall or the like to communicate certain type(s) of network traffic to a different route and/or destination than the typica/intended route and/or destination).

Referring to FIG. 4 a flow diagram is depicted of a fully-automated method 500 for generating computing network architecture diagrams/maps, in accordance with embodiments of the present invention. At Event 510, user inputs are received that define parameters for designing a computing network architecture. In specific embodiments of the method, the user inputs are general information/requirements for the computing network architecture, while in other embodiments of the method, the user inputs are specific hardware, applications and the form that serve to build out a baseline/initial computing network architecture diagram/map.

At Event 520, a computing network vulnerability database is accessed that is configured to store data associated with computing network vulnerabilities/cyber threats including data that serves to mitigate and/or eliminate vulnerabilities and cyber threats, such as software/application patches/revisions or the like. In addition, at Event 520, artificial intelligence (AI) including machine learning (ML) techniques are used to determine vulnerability data within the vulnerability database that is responsive to the user inputs.

At Event 530, a computing network regulation database is accessed that is configured to store data associated with computing network audit/compliance regulations. In addition, at Event 530, artificial intelligence (AI) including machine learning (ML) techniques are used to determine regulation data within the regulation database that is responsive to the user inputs.

At optional Event 540, a computing network historical architecture database is accessed that is configured to store data associated with previously implemented/historical computing network architectures, such as previously generated and/or implemented computing network diagrams/maps. In addition, at Event 540, artificial intelligence (AI) including machine learning (ML) techniques are used to determine historical network architecture data within the computing network historical architecture database that is responsive to at least one of (i) the user inputs, (ii) the vulnerability data and/or (iii) the regulation data.

At Event 555, a computing network architecture diagram/map is generated base on the (i) the user inputs, (ii) the vulnerability data, (iii) the regulation data, and, optionally, (iv) the historical network architecture data. In specific embodiments of the invention, the generated computing network architecture diagram may be further modified by the user as requirements dictate and the modified computing network architecture diagram may serve as the final architecture diagram that is implemented and/or stored in the historical architecture database for subsequent machine-learning purposes. As previously discussed, the generated architecture diagram may be generated anew (i.e., absent a user-generated initial/baseline diagram) or the generated architecture may be a modified version of the initial/baseline diagram generated as a result of the user inputs.

In additional embodiments of the method (not shown in FIG. 4), internal and/or external computing network vulnerabilities are monitored and, in real-time response to detection of a vulnerability/cyber threat, AI and ML are used to determine and, subsequently implement adjustments to the computing network architecture. Such adjustments may include, but are not limited to, modifying network traffic type permissions (i.e., which type of network traffic are permitted/banned from entering and/or exiting the computing network) and re-routing specific types of network traffic within the computing network architecture.

Thus, the present invention provides for using artificial intelligence to generate a computing network architecture diagram based on user inputs, applicable vulnerability/cyber threat data and internal/external compliance/audit regulation data. In addition, machine-learning techniques may be used that leverage previously implemented computing network architectures. The computing network architecture diagram may be generated absent a baseline diagram or the user inputs may define at least a portion of an initial/baseline network architecture diagram that is modified based on the vulnerability/cyber threat data, the internal/external compliance/audit regulation data and/or the previously implemented computing network architectures. In additional embodiments of the invention, new/emerging vulnerabilities and cyber threats are detected, and in real-time response, adjustments to the computing network infrastructure and determined and implemented.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for assuring security in designing a computing network architecture, the system comprising:
    a computing network vulnerability database configured to store first data associated with computing network vulnerabilities;
    a computing network regulation database configured to store second data associated with internal and external computing network regulations; and
    a computer platform in distributed network communication with the computing network vulnerability and computing network regulation databases and including a memory and at least one computing processor in communication with the memory, wherein the memory stores first instructions executable by the at least one processor, and configured to:
        receive user inputs that define parameters for designing a computing network architecture,
        access the computing network vulnerability database and determine, by artificial intelligence (AI) processing including machine learning (ML), a portion of the first data associated with computing network vulnerabilities responsive to the user inputs;
        access the computing network regulation database and determine, by AI processing including ML, a portion of the second data associated with internal and external computing network regulations responsive to the user inputs, and
        generate, by AI processing including ML, a computing network architecture diagram based on (i) the user inputs, (ii) the portion of the first data associated with the computing network vulnerabilities, and (iii) the portion of the second data associated the internal and external computing network regulations.

2. The system of claim 1, further comprising a computing network architecture database configured to store third data associated with previously designed computing network architectures.

3. The system of claim 2, wherein the first instructions are further configured to:
   access the computing network architecture database and determine, by AI processing including ML, a portion of the third data associated with previously designed computing network architectures responsive to at least one of (i) the user inputs, (ii) the portion of the first data, and (iii) the portion of the second data, and
   generate, by AI processing including ML, the computing network architecture diagram based on (i) the user inputs, (ii) the portion of the first data associated with the computing network vulnerabilities, (iii) the portion of the second data associated the internal and external computing network regulations, and (iv) the portion of the third data associated with the previously designed network architectures.

4. The system of claim 1, wherein the first instructions are further configured to:
   receive the user inputs that create at least a portion of an initial computing network architecture diagram, and
   generate, by AI processing and ML, the computing network architecture diagram by modifying the initial computing network architecture diagram based on (i) the user inputs, (ii) the portion of the first data associated with the computing network vulnerabilities, and (iii) the portion of the second data associated the internal and external computing network regulations.

5. The system of claim 1, wherein the first instructions are further configured to provide a rationale for generating the computing network architecture diagram.

6. The system of claim 1, wherein the first instructions are further configured to provide information on one or more cyber threats minimized by the computing network architecture diagram.

7. The system of claim 1, wherein the computing network vulnerability database is configured to store the first data associated with computing network vulnerabilities, wherein the first data includes a plurality computing patches for specified computing software configured to address one or more computing security vulnerabilities.

8. The system of claim 7, wherein the first instructions are further configured to:
   access the computing network vulnerability database and determine, by artificial intelligence (AI) processing including machine learning (ML), one or more of the computing patches responsive to the user inputs;
   generate the computing network architecture diagram including requiring execution of the one or more of the computing patches on at least one of one or more of the computing applications and computing hardware in the computing network architecture diagram.

9. The system of claim 1, wherein the computing network regulation database is configured to store the second data associated with internal and external computing network regulations, wherein the second data includes at least one of internal audit requirements and external audit requirements.

10. The system of claim 1, wherein the first instructions are further configured to
   access the computing network regulation database and determine, by artificial intelligence (AI) processing including machine learning (ML), at least one of the internal audit requirements and the external audit requirements responsive to the user inputs;
   generate the computing network architecture diagram including the at least one of the internal audit requirements and the external audit requirements applicable to computing applications and computing hardware in the computing network architecture diagram.

11. The system of claim 1, wherein the memory of the computer platform stores second instructions executable by the at least one processor, and configured to:
   monitor for detection of computing network vulnerabilities,
   in real-time response to detecting a computing network vulnerability:
      determine, by AI processing including ML, one or more adjustments to a computing network associated with the computing network architecture based on the detected computing network vulnerability, and
      implement the one or more adjustments to the computing network.

12. The system of claim 11, wherein the second instructions configured to monitor include instructions configured to monitor external resources for detection of computing network vulnerabilities.

13. The system of claim 11, wherein the one or more adjustment include modifying types of network traffic permitted to enter or exit the computing network.

14. The system of claim 11, wherein the one or more adjustments include re-routing specified types of network traffic from at least one of a first application and a first computing apparatus to at least one of a second application and a second computing apparatus.

15. A computer-implemented method for assuring security in designing a computing network architecture, the method implemented by one or more processing devices and including:
   receiving user inputs that define parameters for designing a computing network architecture;
   accessing a computing network vulnerability database and determining, by artificial intelligence (AI) processing including machine learning (ML), first data associated with computing network vulnerabilities responsive to the user inputs;
   accessing a computing network regulation database and determining, by AI processing including ML, second data associated with internal and external computing network regulations responsive to the user inputs; and
   generating, by AI processing including ML, a computing network architecture diagram based on (i) the user inputs, (ii) the first data associated with the computing network vulnerabilities, and (iii) the second data associated the internal and external computing network regulations.

16. The computer-implemented method of claim 15, further comprising:
   accessing a computing network architecture database and determining, by AI processing including ML, third data associated with previously designed computing network architectures responsive to at least one of (i) the user inputs, (ii) the first data, and (iii) the second data; and
   wherein generating further comprises generating, by AI processing including ML, the computing network architecture diagram based on (i) the user inputs, (ii) the first data associated with the computing network vulnerabilities, (iii) the second data associated the internal and external computing network regulations, and (iv) the third data associated with the previously designed network architectures.

17. The computer-implemented method of claim 15, wherein receiving the user inputs further comprises receiving the user inputs that create at least a portion of an initial computing network architecture diagram; and wherein generating the computing network architecture diagram further comprises generating, by AI processing and ML, the computing network architecture diagram by modifying the initial computing network architecture diagram based on (i) the user inputs, (ii) the first data associated with the computing network vulnerabilities, and (iii) the second data associated the internal and external computing network regulations.

18. A computer program product comprising:
a non-transitory computer-readable medium comprising:
    a first set of codes for causing a computer to receive user inputs that define parameters for designing a computing network architecture;
    a second set of codes for causing a computer to access a computing network vulnerability database and determine, by artificial intelligence (AI) processing including machine learning (ML), first data associated with computing network vulnerabilities responsive to the user inputs;
    a third set of codes for causing a computer to access a computing network regulation database and determine, by AI processing including ML, second data associated with internal and external computing network regulations responsive to the user inputs; and
    a fourth set of codes for causing a computer to generate, by AI processing including ML, a computing network architecture diagram based on (i) the user inputs, (ii) the first data associated with the computing network vulnerabilities, and (iii) the second data associated the internal and external computing network regulations.

19. The computer program product of claim 18, further comprising:
    a fifth set of codes for causing a computer to access a computing network architecture database and determine, by AI processing including ML, third data associated with previously designed computing network architectures responsive to at least one of (i) the user inputs, (ii) the first data, and (iii) the second data; and
    wherein the fourth set of codes is further configured to generate, by AI processing including ML, the computing network architecture diagram based on (i) the user inputs, (ii) the first data associated with the computing network vulnerabilities, (iii) the second data associated the internal and external computing network regulations, and (iv) the third data associated with the previously designed network architectures.

20. The computer program product of claim 18, wherein the first set of codes is further configured to cause the computer to receive the user inputs that create at least a portion of an initial computing network architecture diagram, and wherein the fourth set of codes is further configured to cause the computer to generate, by AI processing and ML, the computing network architecture diagram by modifying the initial computing network architecture diagram based on (i) the user inputs, (ii) the first data associated with the computing network vulnerabilities, and (iii) the second data associated the internal and external computing network regulations.

* * * * *